United States Patent [19]

Matsukawa et al.

[11] Patent Number: 4,874,227

[45] Date of Patent: Oct. 17, 1989

[54] LARGE-SIZED LIQUID CRYSTAL DISPLAY

[75] Inventors: Hideki Matsukawa; Takeshi Masuyama; Minoru Hirota; Yasuo Wakahata; Masahiro Itoh; Shinji Harada, all of Osaka, Japan

[73] Assignee: Matsushita Electric Industrial Co., Ltd., Osaka, Japan

[21] Appl. No.: 154,436

[22] Filed: Feb. 9, 1988

Related U.S. Application Data

[63] Continuation-in-part of Ser. No. 807,073, filed as PCT JP85/00149 on Mar. 27, 1985, published as WO85/04505 on Oct. 10, 1985, abandoned.

[30] Foreign Application Priority Data

Mar. 28, 1984 [JP] Japan ................................. 59-61479

[51] Int. Cl.[4] .............................................. G02F 1/13
[52] U.S. Cl. ................................. 350/334; 350/339 D; 350/339 F; 350/345; 350/96.24; 350/96.3
[58] Field of Search .............. 350/339 F, 96.27, 96.28, 350/96.24, 345, 334, 339 D, 96.3

[56] References Cited

U.S. PATENT DOCUMENTS

| | | | |
|---|---|---|---|
| 2,938,821 | 5/1960 | Nack | 350/96.29 X |
| 3,091,561 | 9/1957 | Marzocchi et al. | 350/96.29 X |
| 3,279,903 | 10/1966 | Siegmund | 350/96.29 X |
| 3,740,112 | 6/1973 | Lundgren | 350/96.28 |
| 4,057,338 | 11/1977 | Yevick | 350/96.24 |
| 4,076,978 | 2/1978 | Brennan et al. | 350/167 X |
| 4,239,349 | 12/1980 | Scheffer | 350/347 R |
| 4,297,022 | 10/1981 | Lester | 350/334 |
| 4,299,447 | 11/1981 | Soltan et al. | 350/345 |
| 4,390,589 | 6/1983 | Geyling et al. | 350/96.29 X |
| 4,400,054 | 8/1983 | Biard et al. | 350/96.15 |
| 4,435,047 | 3/1984 | Fergason | 350/349 |
| 4,527,864 | 7/1985 | Dir | 350/349 |
| 4,600,274 | 7/1986 | Morozumi | 350/339 F |
| 4,613,210 | 9/1986 | Pollard | 350/334 X |

FOREIGN PATENT DOCUMENTS

| | | | |
|---|---|---|---|
| 0051976 | 5/1982 | European Pat. Off. | 350/431 |
| 0026059 | 1/1962 | Japan . | |
| 3326059 | 1/1962 | Japan . | |
| 0025936 | 9/1965 | Japan . | |
| 0035672 | 8/1968 | Japan . | |
| 0101344 | 8/1979 | Japan | 350/349 |
| 58-062625 | 4/1983 | Japan . | |
| 0184988 | 10/1983 | Japan . | |
| 0022089 | 2/1984 | Japan . | |
| 0105677 | 6/1984 | Japan . | |
| 0123871 | 7/1984 | Japan . | |
| 59-210418 | 11/1984 | Japan . | |
| 0210477 | 11/1984 | Japan . | |

OTHER PUBLICATIONS

Soltan "A New Large Area LC Modular Dispaly", Information Display, Oct. 83, pp. 4 & 6 & 8.

Primary Examiner—Stanley D. Miller
Assistant Examiner—Napoleon Thantu
Attorney, Agent, or Firm—Pollock, Vande Sande & Priddy

[57] ABSTRACT

A large number of liquid crystal display devices is formed on a single plane, each of the liquid crystal display devices being formed by arranging liquid crystal between transparent substrates which allow light from a light source to pass through. Display portions of the respective liquid crystal display devices are covered by a masking member (23) and a light guide which is formed of light guide devices, one or more of which being provided for each of said liquid crystal display devices, and junctions between the liquid crystal display devices are also covered by the light guide. With this structure, when the light guides are formed such that the junctions between the plurality of liquid crystal display devices are also covered, lattice-like non-display lines do not appear, thereby providing substantially visually uniform brightness throughout the entire screen of the large-sized liquid crystal display and improving the entire image.

26 Claims, 9 Drawing Sheets

LARGE-SIZED LIQUID CRYSTAL DISPLAY

This is a continuation-in-part of application Ser. No. 807,073, filed as PCT JP85/00149 on Mar. 27, 1985, published as WO85/04505 on Oct. 10, 1985, now abandoned.

FIELD OF THE INVENTION

This invention relates to large-sized liquid crystal display which is used as a large picture display for a sign or advertisement at railway stations, airports or for projection at halls or theaters.

BACKGROUND OF THE INVENTION

Liquid crystal displays have been widely used as watches, electronic calculators or the like because display can be done with low power consumption. Recently, a large-sized liquid crystal display has been developed which comprises a large number of arranged display elements. This is because it is required to meet public and social needs of providing information to a large number of persons at once.

The structure of a liquid crystal display device constituting such a large-sized liquid crystal display will be described with reference to FIG. 1.

In the liquid crystal display device, sealing resin 2 is positioned around glass plates 1a and 1b to form a given gap so that liquid crystal 3 is enclosed therein. On the two glass plates 1a and 1b are formed transparent electrode leader portions 4a and 4b, and these electrode leader portions 4a and 4b are connected to a drive circuit (not shown). To both outer sides of the glass plates 1a and 1b are attached polarizing plates 5a and 5b, with which the liquid crystal display device is formed. At a light source 6 side of the polarizing plate 5b of the liquid crystal display device is attached a diffusing plate 7.

A large-sized liquid crystal display is formed with a plurality of the above-mentioned liquid crystal display devices being arranged on a plane to form a large-sized screen. FIG. 2 shows a large-sized liquid crystal display constructed in this way, wherein a large number of liquid crystal display devices 8 having the above-mentioned structure are arranged. In FIG. 2, the reference 9 is a junction between adjacent liquid crystal display devices 8, and the reference 10 is a lead wire for connecting the above-mentioned electrode leader portion 4a and 4b to the drive circuit. The side of the electrode leader portion 4a is also drawn to the side of the electrode leader portion 4b to be connected.

However, in such conventional large-sized liquid crystal display, the sealing resin 2 and the electrode leader portions 4a and 4b positioned at the junction 9 are recognized from the front (opposite to the light source 6), and therefore, it forms a frame of the liquid crystal display device 8, resulting in lattice-like lines where no display is shown being seen in the large-sized liquid crystal display. For this reason, the picture on the entire screen is difficult to see, and this has been the largest obstacle to the popularization of large-sized liquid crystal display.

SUMMARY OF THE INVENTION

The present invention attempts to resolve such conventional problems and to provide a large-sized liquid crystal display with which a non-display line caused from the sealing resin and the electrode leader portions positioned at the junctions between a plurality of liquid crystal display devices is recognized. Therefore, the brightness is substantially uniform throughout the screen.

To achieve this object, in the present invention a large number of liquid crystal display devices, each formed such that liquid crystal is arranged between transparent substrates through which light from a light source passes, are arranged on a single plasma, and display portions of the respective liquid crystal display devices are covered by a plurality of light guides, each formed of a plurality of light guide elements which are provided such that at least one of them is provided for each of the liquid crystal display devices, and also junctions between the above-mentioned respective liquid crystal display devices are covered by the same. According to this structure, the screen is formed by the light guide so that the junctions of a plurality of liquid crystal display devices are also covered, and thus a non-display line of lattice fashion does not appear, equalizing the brightness throughout the screen in sense of sight, and improving the entire picture.

DETAILED DESCRIPTION OF THE INVENTION

Figure 1:
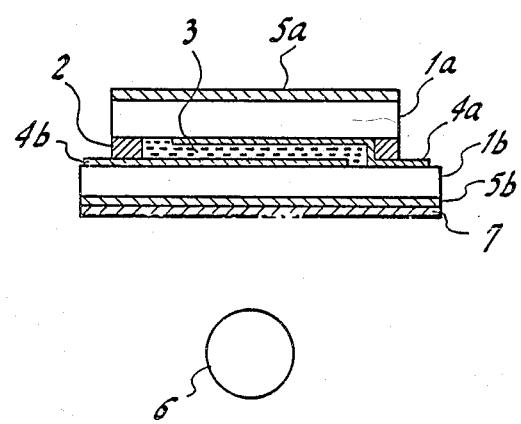
FIG. 1 is a diagram showing the structure of a general liquid crystal display device.
Figure 2:
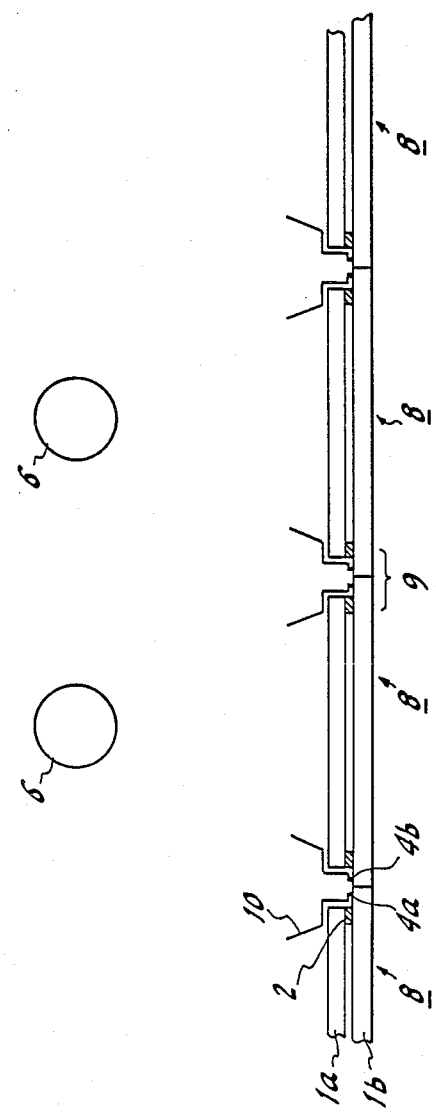
FIG. 2 is a schematic diagram of a conventional large-sized display.

The present invention will be described hereinbelow with reference to drawings. Elements of the embodiments of the present invention which are the same as those in the conventional examples are denoted by the same references, and the description thereof is omitted.

| TABLE OF REFERENCE NUMERALS IN THE DRAWINGS | |
|---|---|
| 1a, 1b | glass plates |
| 2 | sealing resin |
| 3 | liquid crystal |

-continued

TABLE OF REFERENCE NUMERALS IN THE DRAWINGS

| | |
|---|---|
| 4a, 4b | electrode leader portions |
| 5a, 5b | polarizing plates |
| 6 | light source |
| 7 | diffusion plate |
| 8 | liquid crystal display elements |
| 9 | junctions |
| 10 | lead wires |
| 11 | pixels |
| 12 | light guide elements |
| 13 | light guide |
| 14 | adhering portion |
| 15 | solid body |
| 16 | mirror surface |
| 17 | diffusion reflection surface |
| 18, 20 | frames |
| 19 | liquid crystal display unit |
| 21 | diffusion plate |
| 22 | color filters |
| 23 | opaque masking member |

Figure 3:
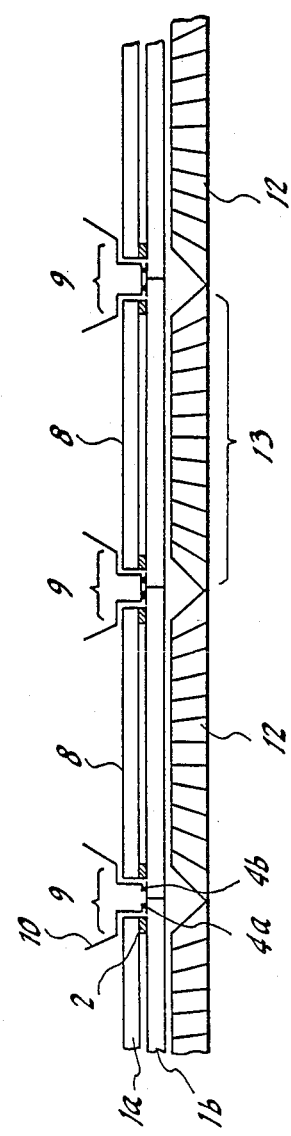
FIG. 3 is schematic diagram showing an embodiment of the large-sized liquid crystal display according to the present invention.
Figure 4:
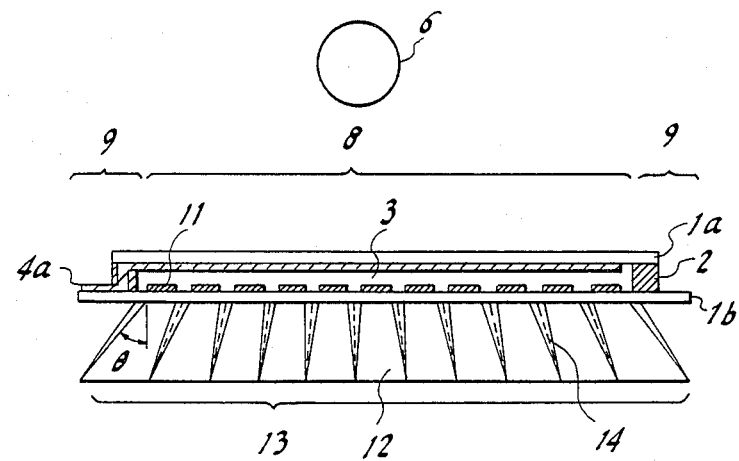
FIG. 4 is a schematic diagram showing an enlarged view of an important portion of the FIG. 3 display.
Figure 5:
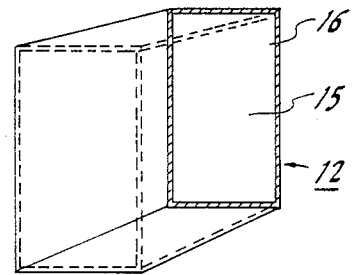
FIG. 5 is an enlarged perspective view of a light guide forming a display according to the present invention.

FIGS. 3 through 5 show an embodiment of the present invention. First of all, a large number of liquid crystal display devices 8 of the above-mentioned structure is arranged on a single plane, and a plurality of light sources 6 is arranged at the rear side thereof. The reference 9 indicates junctions between adjacent liquid crystal display devices 8, and the reference 10 indicates lead wires for connecting the above-mentioned electrode leader portions 4a and 4b to the drive circuit. The electrode leader portion 4a side is also drawn to the electrode leader portion 4b side to be connected. In the present invention, however, a plurality of light guide elements 12 are provided where each light guide element 12 has a size corresponding to respective pixels 11 formed on a transparent electrode within liquid crystal display device 8 so as to guide light rays from each pixel 11. The shape of the light guide element 12 is such that the area of an end surface opposite to the end connected to the pixel 11 is larger than the area of the other end so as to enlarge a display area.

Furthermore, the light guide 13 corresponding to a single liquid crystal display device 8 is a set of a plurality of light guide elements 12 and is of honeycomb shape; and the sum of areas of end surfaces opposite to those connected to the respective pixels 11 is substantially equal or to comparable with an area corresponding to the sum of the liquid crystal display device 8 and one half the width of the junction 9. With such structure, therefore, the light guide elements 12 forming the honeycomb-shaped light guide 13 necessarily exist above the junctions 9. The above-mentioned light guide element 12 has a structure, as shown in FIG. 5, such that on an inner wall of a hollow cylindrical member 15 made of a resin molding, such as acrylic resin, ABS (acrylonitrile butadiene styrene) resin or the like, or a metal molding, a mirror surface (total reflection surface) 16 made of a metal, such as aluminum whose reflection coefficient is high, is provided. It is practical that the mirror surface 16 is formed by way of aluminum vapor deposition in view of reflection coefficient and the number of manufacturing processes. The light guide element 12 may be formed by providing a mirror surface (total reflection surface), whose reflection coefficient is high, on an outer surface of a member having a high transmittance.

Figure 6:
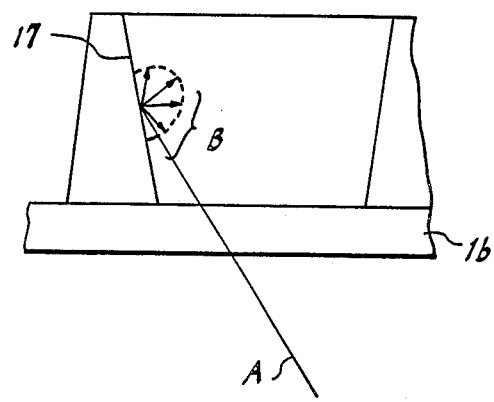
FIGS. 6 and 7 are structural diagrams of the light guide formed of a diffusing reflecting surface and a mirror surface for the description of the present invention.
Figure 7:
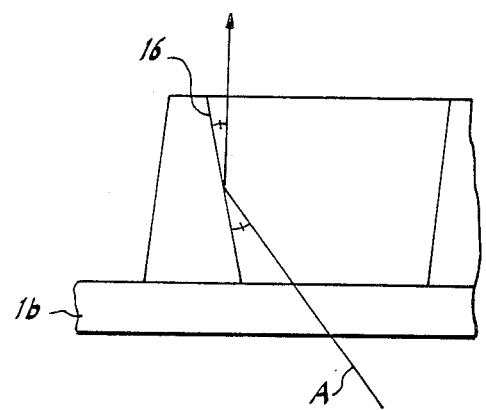

The reason that the light guide element 12 requires the mirror surface 16 is, as seen from the comparison between FIGS. 6 and 7, that with a diffusion reflection surface 17 as shown in FIG. 6 the light ray "A" electrically transmitted through the liquid crystal display device 8 is diffused and reflected at the diffusion reflection surface 17, and especially components "B" directed toward the light source 6 among the reflected components repeat reflection between the diffusion reflection surface 17 and the glass plate 1b, resulting in the decrease in light amount. Therefore, the amount of light outputted from the display portion drops largely. On the other hand, in the case of the mirror surface 16 of FIG. 7 showing an embodiment of the present invention, the incident angle is equal to reflection angle while it is constructed of a member having a high reflection coefficient, and thus the number of reflections is minimum, thereby reducing substantially the drop of light amount. Namely, because of the necessity of guiding the light rays emitted from the respective pixels 11 with minimum dropping of light amount, the light guide element 12 must have a mirror surface 16.

When considering the light guide elements 12 forming the above-mentioned honeycomb-shaped light guide 13 as having a structure in which a mirror surface 16 is provided by aluminum vapor deposition on the inner surface of a hollow cylindrical body 15 made of ABS resin, for instance, the reflection of approximately 83 to 85% is obtained. To this end it is necessary for peripheral light guide elements 12 that the inclination angle $\theta$ shown in FIG. 4 is set to approximately 10 degrees (in the case of using guest-host type liquid crystal as the liquid crystal 3). Although it is unpreferable to set this angle $\theta$ to approximately 10 degrees in view of the fact that the weight of the light guide element 12 can be reduced by shortening the same with the inclination angle $\theta$ being set to a large value close to 90 degrees, such very large angle $\theta$ (more than 20 degrees according to experiments) causes the occurrence of dropping in brightness due to the increase in the number of times of reflections of light rays at the reflection surface (mirror surface 16), generating inequality in brightness. For this reason 10 degree is adopted. This inclination angle $\theta$ becomes smaller and smaller to be close to 0 as approaching the center of the panel because it is necessary that the area of a displaying portion of the light guide elements 12 are equal to each other.

As the liquid crystal 3 arranged in the above-mentioned liquid crystal display device 8, twist-nematic (TN) type liquid crystal, guest-host (G-H) type liquid crystal, and other type liquid crystal, which are all known in the art, may be used. Generally, TN type liquid crystal or G-H type liquid crystal, each of which having advantages and disadvantages, is used. The TN type liquid crystal is suitable for a displaying unit used mainly for displaying characters. Namely, this is because one using TN type liquid crystal does not require gradation and has an advantage that it exhibits a relatively bright characteristic. However, while the visual angle varies depending on the structure of a panel, the angle (viewing angle) with which surface brightness is one half that at the front is 30 degrees or so, and there is a disadvantage that it is not suitable for a large-sized display formed by arranging a large number of liquid crystal display devices on a single plane as in the present invention.

On the other hand, since the G-H type liquid crystal, which is disclosed in patent publication (Tokkoshou) 47-3778 or the like, has transmittance lower than that of TN type liquid crystal, it is not as good as the TN type in connection with the brightness of the screen, but has a visual angle which is approximately twice that of the TN type, and therefore, G-H type is advantageous for large-sized display. Furthermore, G-H type liquid crystal has an advantage that gradation control can be readily performed since the transmittance curve is gentle. Transmittance corresponds to amount of light transmitted through the panel with respect to applied voltage, and therefore, it is suitable for displaying images. The above-mentioned shortage in screen brightness can be compensated for by the power of light source.

Figure 8:
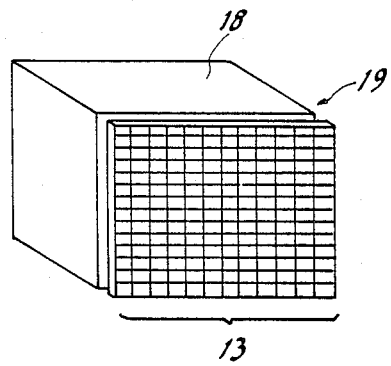
FIG. 8 is a perspective view showing one of the units forming the large-sized liquid crystal display according to the present invention.
Figure 9:
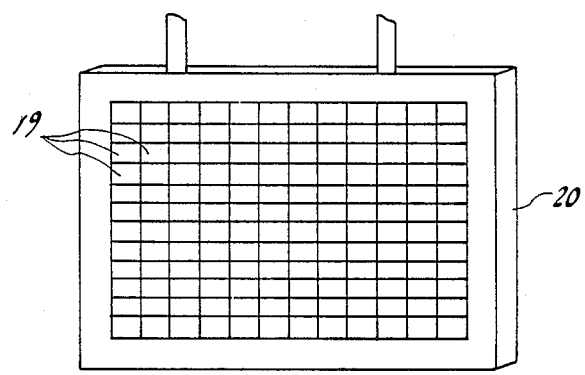
FIG. 9 is a perspective view showing a state where the units are combined to form a large-sized liquid crystal display.

FIG. 8 shows a state where a liquid crystal display device 8 is attached to a frame 18 and a light guide 13 is arranged at the front surface of the liquid crystal display device 8 to form a liquid crystal display unit 19. A plurality of the liquid crystal display units 19 is arranged in longitudinal direction and in transverse direction as shown in FIG. 9 to be secured and a frame 20 is provided at the periphery thereof so as to form a large-sized liquid crystal display.

Figure 10:
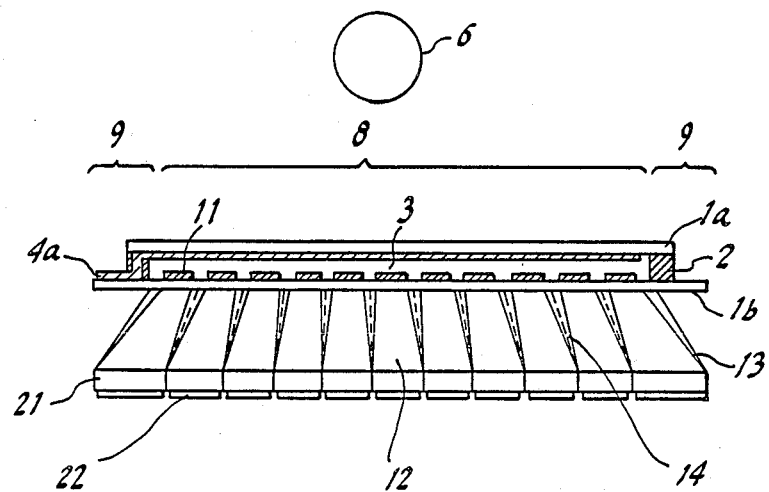
FIGS. 10, 11 and 12 are schematic diagrams respectively showing another embodiment of the present invention.

FIG. 10 shows an embodiment in which a diffusion plate 21 is connected to the front surface of the light guide 13. The diffusion plate 21 is made of acrylic resin or polycarbonate to have light diffusion characteristics, and is attached to the front surface of the light guide 13 by way of telescopic engagement between a recess and a projecting portion or by way of an adhesive. With this arrangement, by switching respective pixels of the liquid crystal display devices 8, the luminous flux, emitted from the light source 6 positioned at the back side, transmits through the liquid crystal display devices 8 to pass through the light guide 13, and the luminous flux passing through the light guide 13 is diffused by the diffusing plate positioned at the front surface, and thus visual angle is widened. Color filters 22 are formed by printing color ink on the front surface of the diffusion plates 21 in correspondence with respective light guide elements 12 so as to reproduce colors R, G, B. Namely, the light passed through the light guide 13 is diffused by the diffusion plate 21 and is passed through the color filter 22 so as to select a desired color wavelength.

Figure 11:
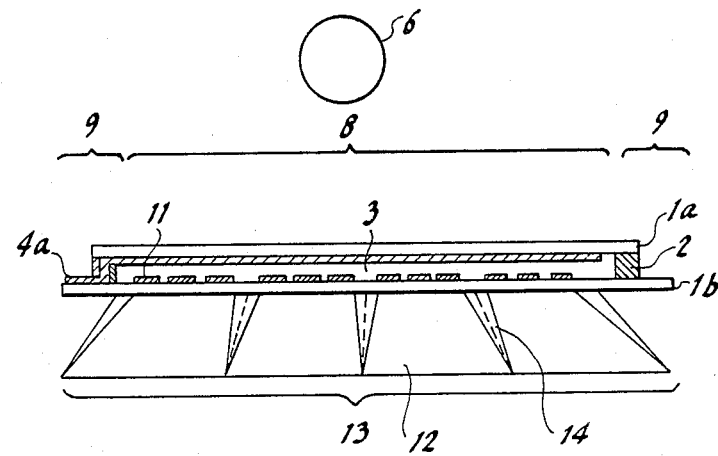
Figure 12:
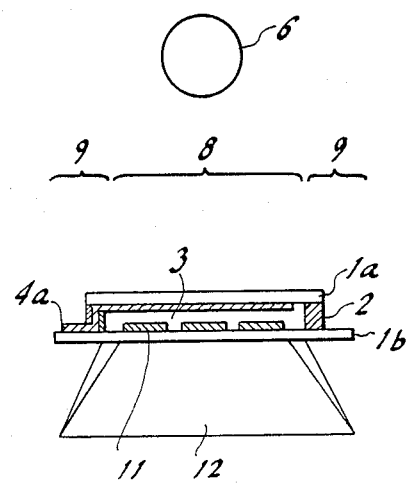

Although it has been described in the above-mentioned embodiment that the light guide element 12 has a size so that it covers the outer periphery of a single pixel 11 within a liquid crystal display device 8, a plurality of pixels 11 may be covered by a single light guide element 12 by arranging the combination of R, G, B as a unit as shown in FIG. 11 depending on the arrangement of pixels in the liquid crystal display device 8. Furthermore, a single liquid crystal display device 8 may be covered by a single light guide as shown in FIG. 12 depending on the number of pixels and the way of arrangement of pixels.

Figure 13:
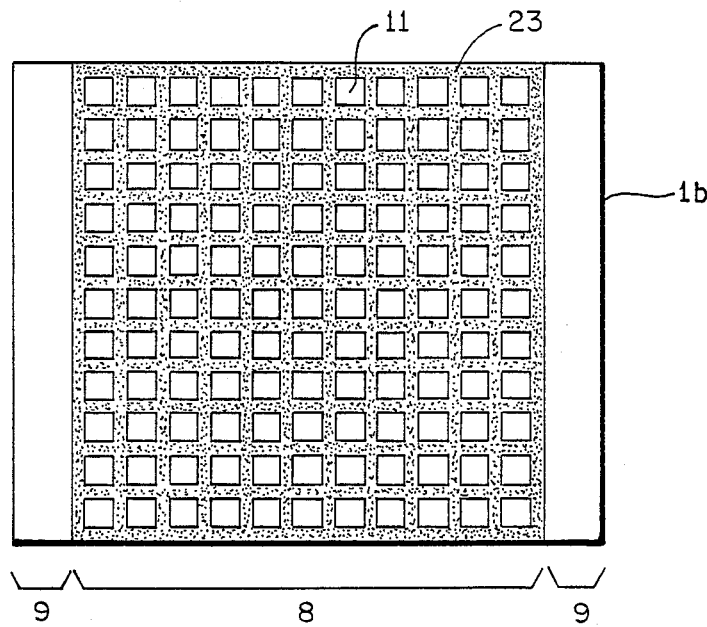
FIG. 13 is a front elevational view of a liquid crystal display device according to a further embodiment of the present invention.
Figure 14:
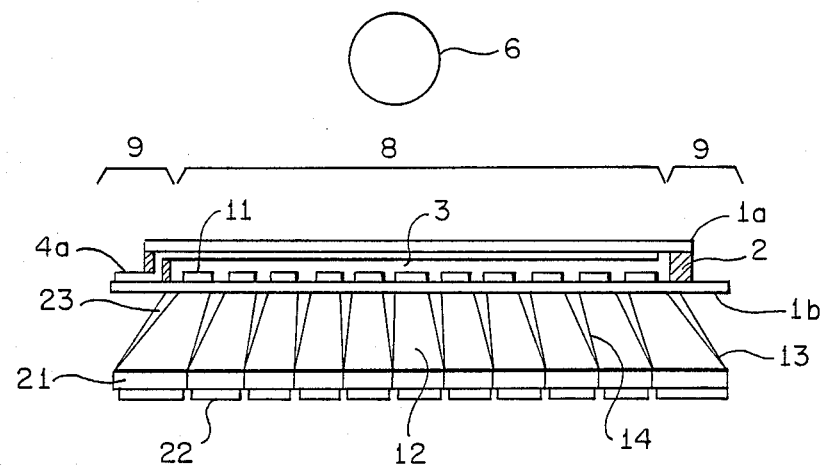
FIG. 14 is a sectional view showing a state where the light guides are arranged at the front side of the liquid crystal display device of FIG. 13.

FIG. 13 is a front elevational view of a liquid crystal display device according to a further embodiment of the present invention; and FIG. 14 is a sectional view showing a state where the light guides are arranged at the front side of the liquid crystal display device of FIG. 13.

In the embodiment illustrated at FIGS. 13 and 14, an opaque masking member 23 is provided on the glass plate 1b to block light passing through spaces between the pixels 11 such that each of the pixels 11 is encircled thereby when viewed from the front of the liquid crystal display device 8 as shown in FIG. 13. The masking member 23 is provided by way of printing, using black ink or dark ink, or by adhering black or dark masking tape onto the glass plate 1b.

Usually, letters and shapes are displayed on the liquid crystal display devices 8 by controlling light passing through the pixels 11. At this time, the light passing through the spaces between the pixels 11 causes unclear displayed images. Particularly, when the light guide 13 is arranged at the front side of the liquid crystal display device 8, if each of the pixels 11 does not exactly correspond to each light guide element 12, displayed images become unclear due to light from adjacent pixels 11 and the light passing through the spaces between the pixels 11.

However, in the present invention, since the masking member 23 is provided at the front side of the liquid crystal display device 8, the light from adjacent pixels 11 and the light passing through the spaces between the pixels 11 are effectively blocked thereby, even if each of the pixels 11 does not exactly correspond to each light guide element 12. Therefore, the displayed images become clear so that a satisfactory picture is obtained throughout the entire screen. In addition, the masking member 23 facilitates easy positioning of the light guide 13 because the masking member 23 is clearly seen from the front as mentioned above. Therefore, assembly of liquid crystal display unit 19 becomes also easier.

Besides, each light guide element 12 is provided with a diffusion plate 21 and a color filter 22 corresponding to each pixel 11 at the front side thereof. The color filter 22 is provided by way of printing color ink so as to provide three primary colors red, green and blue. In this embodiment, although the diffusion plate 21 is provided between the color filter 22 and the light guide element 12, the color filter 22 may be directly printed on the light guide element 12 without the diffusion plate 21.

CAPABILITY OF INDUSTRIAL APPLICATION

The large-sized liquid crystal display according to the present invention is formed as described in the above, and since a light guide, which guides light rays from respective pixels of a plurality of liquid crystal display devices, is provided at the front surfaces of the liquid crystal display devices to be positioned above sealing resin portions and electrode leader portions which are positioned at junctions between a plurality of liquid crystal display devices, no lattice-like non-display line appears visually so that it is possible to provide a satisfactory picture through the entire screen. Moreover, since the light guide is formed of mirror surface (total reflection surface), only small light energy loss occurs, in contrast with the case of diffusion reflection surface. Therefore, the deterioration in brightness throughout the entire screen is substantially comparable with that of the screen using no light guide.

We claim:
1. A large-sized liquid crystal display comprising:
(a) a large number of liquid crystal display devices arranged on a single plane, each of said liquid crystal devices being formed by arranging pixels in a guest-host liquid crystal interposed between transparent substrates which allow light from a light source to pass through;
(b) a plurality of light guides each having at least one light guide element corresponding to each of said liquid crystal display devices for guiding light rays, each of said light guide elements including a hollow cylindrical resin molding having a mirror surface formed by aluminum vapor being deposited on an inner surface of said hollow cylindrical resin molding, the number of said light guide elements being equal to that of said pixels in said liquid crystal display devices, each of said light guides being positioned to cover display portions of said respective liquid crystal display devices and also junctions between said liquid crystal display devices, each of said light guide elements being inclined with respect to a plane of glass plates forming said liquid crystal display devices such that the inclination angle of said light guide elements is maximum at the periphery of the panel and becomes smaller as the center of said panel is approached, said light guides being shaped such that its area of its one side is larger than the area of the other side which is connected to said liquid crystal display devices, each liquid guide element being provided with a color filter at the front side thereof by way of printing using color ink so as to provide colors red, blue, or green; and (c) a plurality of masking opaque members each provided at the front surface of each of said liquid crystal display devices such that said pixels in said liquid crystal display devices are respectively encircled thereby when viewed from the front of said liquid crystal display devices.

2. A large-sized liquid crystal display comprising:
(a) a large number of liquid crystal display devices on a single plane, each formed by arranging pixels in liquid crystal interposed between transparent substrates which allow light from a light source to pass through;
(b) a plurality of light guides each having at least one light guide element corresponding to each of said liquid crystal display devices for guiding light rays, each of said light guides being positioned to cover display portions of said respective liquid crystal display devices and also junctions between said liquid crystal display devices; and
(c) a plurality of opaque masking members each provided at the front surface of each of said liquid crystal display devices such that said pixels in said liquid crystal display devices are respectively encircled thereby when viewed from the front of said liquid crystal display devices.

3. A large-sized liquid crystal display as claimed in claim 2, further comprising a plurality of diffusion plates, each of said diffusion plates being positioned at the front surface of each of said light guide elements.

4. A large-sized liquid crystal display as claimed in claim 2, wherein said light guide comprises light guide elements whose number is equal to that of said pixels in each of said liquid crystal display devices.

5. A large-sized liquid crystal display as claimed in claim 2, wherein said light guide element is formed of a hollow cylindrical solid body having a mirror surface at an inner surface thereof.

6. A large-sized liquid crystal display as claimed in claim 2, wherein said light guide element is formed of a light conductive solid body having a mirror surface at an outer surface thereof.

7. A large-sized liquid crystal display as claimed in claim 2, wherein said light guide element is formed of a member having a mirror surface which is formed by aluminum vapor being deposited on an inner surface of a hollow cylindrical resin molding.

8. A large-sized liquid crystal display as claimed in claim 2, wherein said liquid crystal arranged in said liquid crystal display device comprises a guest-host liquid crystal.

9. A large-sized liquid crystal display as claimed in claim 4, wherein said light guide elements are respectively provided with an inclination with respect to a plane or transparent substrates forming said liquid crystal display device such that the inclination angle of said light guide elements is maximum at the periphery of the panel and becomes smaller as the center of said panel is approached.

10. A large-sized liquid crystal display comprising:
(a) a large number of liquid crystal display devices on a single plane, each formed by arranging pixels in liquid crystal interposed between transparent substrates which allow light from a light source to pass through;
(b) a plurality of light guides each having at least one light guide element corresponding to each of said liquid crystal display devices for guiding light rays, each of said light guide elements including a hollow cylindrical member having a mirror surface at an inner surface of said hollow cylindrical member, each of said light guides being positioned to cover display portions of said respective liquid crystal display devices and also junctions between said liquid crystal display devices; and
(c) a plurality of opaque masking members each provided at the front surface of each of said liquid crystal display devices such that said pixels in said liquid crystal display devices are respectively encircled thereby when viewed from the front of said liquid crystal display devices.

11. A large-sized liquid crystal display as claimed in claim 10, wherein said light guide comprises light guide elements whose number is equal to that of said pixels in each of said liquid crystal display devices.

12. A large-sized liquid crystal display as claimed in claim 10, wherein said light guide element is formed of a member having a mirror surface which is formed by aluminum vapor being deposited on an inner surface of a hollow cylindrical resin molding.

13. A large-sized liquid crystal display as claimed in claim 10, wherein said liquid crystal arranged in said liquid crystal display device comprises a guest-host liquid crystal.

14. A large-sized liquid crystal display as claimed in claim 10, wherein said light guide elements are provided with an inclination with respect to a plane of transparent substrates forming said liquid crystal display devices such that the inclination angle of said light guide elements is maximum at the periphery of the panel and becomes smaller as the center of said panel is approached.

15. A large-sized liquid crystal display comprising:
(a) a large number of liquid crystal display devices on a single plane, each formed by arranging pixels in liquid crystal interposed between transparent substrates which allow light from a light source to pass through;
(b) a plurality of light guides each having at least one light guide element corresponding to each of said liquid crystal display devices for guiding light rays, each of said light guide elements including a light conductive member having a mirror surface at an outer surface of said member, each of said light guides being positioned to cover display portions of said respective liquid crystal display devices and also junctions between said liquid crystal display devices; and
(c) a plurality of opaque masking members each provided at the front surface of each of said liquid crystal display devices such that said pixels in said liquid crystal display devices are respectively encircled thereby when viewed from the front of said liquid crystal display devices.

16. A large-sized liquid crystal display as claimed in claim 15, wherein said light guide comprises light guide elements whose number is equal to that of said pixels in each of said liquid crystal display devices.

17. A large-sized liquid crystal display as claimed in claim 15, wherein said liquid crystal arranged in said liquid crystal display device comprises a guest-host liquid crystal.

18. A large-sized liquid crystal display as claimed in claim 16, wherein said light guide elements are provided with an inclination with respect to a plane of transparent substrates forming said liquid crystal display devices such that the inclination angle of said light guide elements is maximum at the periphery of the panel and becomes smaller as the center of said panel is approached.

19. A large-sized liquid crystal display comprising:
(a) a large number of liquid crystal display devices on a single plane, each formed by arranging pixels in liquid crystal interposed between transparent substrates which allow light from a light source to pass through;
(b) a plurality of light guides each having at least one light guide element, each of said light guide elements including a hollow cylindrical member having a mirror surface at an inner surface of said hollow cylindrical member, the number of said light guide elements being equal to that of said pixels in said liquid crystal display devices, each of said light guides being positioned to cover display portions of said respective liquid crystal display devices and also junctions between said liquid crystal display devices, each of said light guide elements being provided with an inclination with respect to a plane of glass plates forming said liquid crystal display elements such that the inclination angle of said light guide elements is maximum at the periphery of the panel and becomes smaller as the center of said panel is approached; and
(c) a plurality of opaque masking members each provided at the front surface of each of said liquid crystal display devices such that said pixels in said liquid crystal display devices are respectively encircled thereby when viewed from the front of said liquid crystal display devices.

20. A large-sized liquid crystal display as claimed in claim 19, wherein said liquid crystal arranged in said liquid crystal display device comprises a guest-host liquid crystal.

21. A large-sized liquid crystal display comprising:
(a) a large number of liquid crystal display devices on a single plane, each formed by arranging pixels in liquid crystal interposed between transparent substrates which allow light from a light source to pass through;
(b) a plurality of light guides each having at least one light guide element, each of said light guide elements including a mirror surface formed by aluminum vapor being deposited on an inner surface of a hollow cylindrical resin molding, the number of said light guide elements being equal to that of said pixels in said liquid crystal display devices, each of said light guides being interposed to cover display portions of said respective liquid crystal display devices and also junctions between said liquid crystal display devices, each of said light guide elements being provided with an inclination with respect to a plane of glass plates forming said liquid crystal display element such that the inclination angle of said light guide elements is maximum at the periphery of the panel and becomes smaller as the center of said panel is approached; and
(c) a plurality of opaque masking member each provided at the front surface of each of said liquid crystal display devices such that said pixels in said liquid crystal display devices are respectively encircled thereby when viewed from the front of said liquid crystal display devices.

22. A large-sized liquid crystal display as claimed in claim 21, wherein said liquid crystal arranged in said liquid crystal display device comprises a guest-host liquid crystal.

23. A large-sized liquid crystal display comprising:
(a) a large amount of liquid crystal display devices on a single plane, each formed by arranging pixels in liquid crystal interposed between transparent substrates which allow light from a light source to pass through;
(b) a plurality of light guides each having at least one light guide element corresponding to each of said liquid crystal display devices for guiding light rays, said light guides being shaped such that its area of its one side is larger than the area of the other side which is connected to said liquid crystal display devices, each of said light guides being positioned to cover display portions of said respective liquid crystal display devices and also junctions between said liquid crystal display devices; and
(c) a plurality of opaque masking member each provided at the front surface of each of said liquid crystal display devices such that said pixels in said liquid crystal display devices are respectively encircled thereby when viewed from the front of said liquid crystal display devices.

24. A large-sized liquid crystal display as claimed in claim 23, wherein said light guide comprises light guide elements whose number is equal to that of said pixels in each of said liquid crystal display devices.

25. A large-sized liquid crystal display as claimed in claim 23, wherein said liquid crystal arranged in said liquid crystal display device comprises a guest-host liquid crystal.

26. A large-sized liquid crystal display comprising:
(a) a large number of liquid crystal devices on a single plane, each formed by arranging pixels in liquid crystal interposed between transparent substrates which allow light from a light source to pass through;
(b) a plurality of light guides each having at least one light guide element, each of said light guide elements including a mirror surface formed by aluminum vapor being deposited on an inner surface of a hollow cylindrical resin molding, the number of said light guide elements being equal to that of said pixels in said liquid crystal display devices, each of said light guides being positioned to cover display portions of said respective liquid crystal display devices and also junctions between said liquid crystal display devices, said light guides being shaped such that its area of its one side is larger than the area of the other side which is connected to said liquid crystal display devices, each of said light guide elements being provided with an inclination with respect to a plane of glass plates forming said liquid crystal display elements such that the inclination angle of said light guide elements is maximum at the periphery of the panel and becomes smaller as the center of said panel is approached; and (c) a plurality of opaque masking member each provided at the front surface of each of said liquid crystal display devices such that said pixels in said liquid crystal display devices are respectively encircled thereby when viewed from the front of said liquid crystal display devices.

* * * * *